USO09757821B2

(12) United States Patent
Thomas et al.

(10) Patent No.: US 9,757,821 B2
(45) Date of Patent: Sep. 12, 2017

(54) SYSTEM AND METHOD FOR IN-SITU RESURFACING OF A WIND TURBINE MAIN ROTOR SHAFT

(71) Applicant: General Electric Company, Schenectady, NY (US)

(72) Inventors: Gregory Clarence Thomas, Saratoga Springs, NY (US); Richard Arland Ohl, Jr., Hudson, NY (US)

(73) Assignee: General Electric Company, Schenectady, NY (US)

( * ) Notice: Subject to any disclaimer, the term of this patent is extended or adjusted under 35 U.S.C. 154(b) by 262 days.

(21) Appl. No.: 14/755,152

(22) Filed: Jun. 30, 2015

(65) Prior Publication Data
US 2017/0002790 A1    Jan. 5, 2017

(51) Int. Cl.
*B23C 3/12*    (2006.01)
*B23P 6/00*    (2006.01)
(Continued)

(52) U.S. Cl.
CPC    *B23P 6/00* (2013.01); *B23B 5/08* (2013.01); *F03D 9/25* (2016.05); *F03D 13/10* (2016.05); *F03D 15/00* (2016.05); *F03D 80/50* (2016.05); *F03D 80/82* (2016.05); *F03D 80/88* (2016.05); *Y02E 10/728* (2013.01)

(58) Field of Classification Search
CPC . B23C 3/122; F05D 2230/72; F05D 2230/80; F01D 5/06; Y10T 29/49318; Y10T 29/49325; Y10T 29/38
See application file for complete search history.

(56) References Cited

U.S. PATENT DOCUMENTS 4,537,538 A * 8/1985 Mitamura ............ B23D 37/14
409/217
6,833,632 B2    12/2004 Becker et al.
(Continued)

FOREIGN PATENT DOCUMENTS

EP    2525080 A1    11/2012

OTHER PUBLICATIONS

"Serving the Wind Industry" In-Place Machining Company; Jan. 20, 2011; www.inplace.com.
(Continued)

*Primary Examiner* — Will Fridie, Jr.
(74) *Attorney, Agent, or Firm* — Dority & Manning, P.A.

(57)    ABSTRACT

A method is provided for in-situ resurfacing of a main rotor shaft of a wind turbine, wherein in an operational state, the main rotor shaft is coupled at a first end to a rotor hub and at the opposite second end to a gearbox or directly to a generator within a nacelle. The method includes uncoupling the rotor shaft from the gearbox or generator so as to expose an end face of the second end of the rotor shaft. A fixture is attached to the exposed end face concentric with the rotational axis of the rotor shaft. A lathe system in then attached to the fixture. The rotor shaft surface adjacent to the exposed end is machined with the lathe system such that the resurfaced portion of the rotor shaft surface is brought to a round state concentric with the rotational axis of the rotor shaft. The method is conducted within the nacelle with the first end of the rotor shaft remaining coupled to the rotor.

7 Claims, 4 Drawing Sheets

(51) Int. Cl.
    *F03D 15/00*     (2016.01)
    *B23B 5/08*     (2006.01)
    *F03D 9/25*     (2016.01)
    *F03D 13/10*     (2016.01)
    *F03D 80/50*     (2016.01)
    *F03D 80/80*     (2016.01)

(56) References Cited

U.S. PATENT DOCUMENTS

| | | |
|---|---|---|
| 7,946,819 B2 | 5/2011 | Hidding et al. |
| 8,197,215 B2 | 6/2012 | Andersen et al. |
| 8,376,708 B2 | 2/2013 | Patel et al. |
| 8,813,331 B2 * | 8/2014 | Dimmick, III ........ F01D 5/005 29/402.01 |
| 2006/0230612 A1 * | 10/2006 | Coffey ................ B23B 27/04 29/889.1 |
| 2010/0162544 A1 * | 7/2010 | Sassatelli ............ F01D 25/002 29/23.51 |
| 2010/0275442 A1 | 11/2010 | Ohl |
| 2013/0192930 A1 | 8/2013 | Segovia et al. |
| 2015/0096174 A1 * | 4/2015 | Lohan ................ F03D 1/003 29/889.1 |
| 2015/0135534 A1 | 5/2015 | Viscome et al. |
| 2016/0040545 A1 * | 2/2016 | Klusacek ............ F02B 37/00 416/204 A |
| 2016/0047278 A1 * | 2/2016 | Edwards ............. F01D 25/285 248/542 |

OTHER PUBLICATIONS

European Search Report and Opinion issued in connection with corresponding European Application No. 16176281.0 on Nov. 8, 2016.

\* cited by examiner

SYSTEM AND METHOD FOR IN-SITU RESURFACING OF A WIND TURBINE MAIN ROTOR SHAFT

FIELD OF THE INVENTION

The present subject matter relates generally to wind turbines and, more particularly, to a method and related system for in-situ resurfacing of the main rotor shaft of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and the rotor blade to allow for rotation about a pitch axis. The rotor blades capture kinetic energy of wind using known airfoil principles. The rotor blades transmit the kinetic energy in the form of rotational energy so as to turn a main rotor shaft coupled to a gearbox, or if a gearbox is not used, directly to the generator. The generator then converts the mechanical energy to electrical energy that may be deployed to a utility grid.

With certain conventional configurations, the rotor shaft is connected to the gearbox via a shrink fit coupling. Certain maintenance procedures, however, require separation of the rotor shaft from the gearbox. During this process, material can be removed and/or deposited on to the rotor shaft at surfaces where the rotor shaft mates with the gearbox, which requires resurfacing of the rotor main shaft to ensure that the rotor shaft is round, concentric to its original rotational axis, and free of defects for a proper shrink fit with the gearbox prior to placing the wind turbine back into operation. With conventional practices, this resurfacing procedure requires removal of the rotor shaft from the drive train (e.g., from the rotor and the gearbox) with a large crane brought to the wind turbine and subsequent off-site machining at significant costs and down time.

Thus, an improved system and method for resurfacing the main rotor shaft of a wind turbine without the necessity of removing the rotor shaft from the drive train (and nacelle) would be desired in the industry.

BRIEF DESCRIPTION OF THE INVENTION

Aspects and advantages of the invention will be set forth in part in the following description, or may be obvious from the description, or may be learned through practice of the invention.

In one embodiment, a method for in-situ resurfacing of a main rotor shaft of a wind turbine is provided, wherein in an operational state, the main rotor shaft is coupled at a first end to a rotor hub and at the opposite second end to a gearbox or directly to a generator within a nacelle. The method includes uncoupling the rotor shaft from the gearbox or generator so as to expose an end face of the second end of the rotor shaft. A fixture is attached to the exposed end face concentric with a rotational axis of the rotor shaft. A lathe system is then attached to the fixture and is used to machine the rotor shaft surface adjacent to the exposed end face such that the resurfaced portion of the rotor shaft surface is brought to a round state concentric with the rotational axis of the rotor shaft. The method is conducted within the nacelle of the wind turbine with the first end of the rotor shaft remaining coupled to the rotor.

In a certain embodiment, the rotor shaft is rotationally locked and the lathe system includes a turning bar with attached machining tool that is rotated around the rotor shaft concentric to the rotational axis of the rotor shaft.

The fixture may be variously configured. For example, the fixture may include a plate member bolted to holes defined in the end face of the rotor shaft in a pattern and location that ensures concentricity of the lathe system with the rotational axis, the plate member having an extension on which the lathe system is attached.

The rotor shaft may be coupled to an input shaft of a gearbox, and the uncoupling step includes removing a shrink fit coupling from the coupled input shaft and rotor shaft.

In certain method embodiments, the end face of the rotor shaft is flush, and the fixture is a plate member mounted flush against the end face at a location that ensures concentricity of the lathe system with the rotational axis.

In an alternate embodiment, the end face of the rotor shaft has a recess defined therein, and the fixture has an extension fitted into the recess and a plate member mounted to the end face around the recess at a location that ensures concentricity of the lathe system with the rotational axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
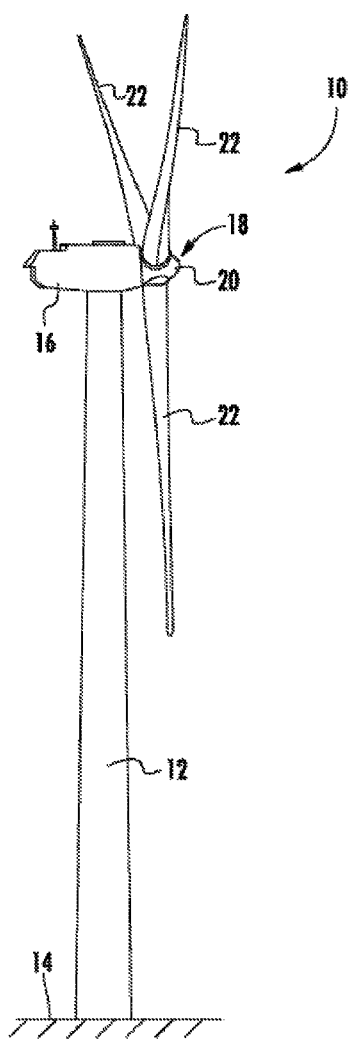
FIG. 1 illustrates a perspective view of one embodiment of a conventional wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 is operatively coupled to the rotor 18 by a pitch bearing (not shown). Further, each rotor blade 22 may be spaced about the hub 20 to facilitate rotating the rotor 18 to enable kinetic energy to be transferred from the wind into usable mechanical energy, and subsequently, electrical energy.

Figure 2:
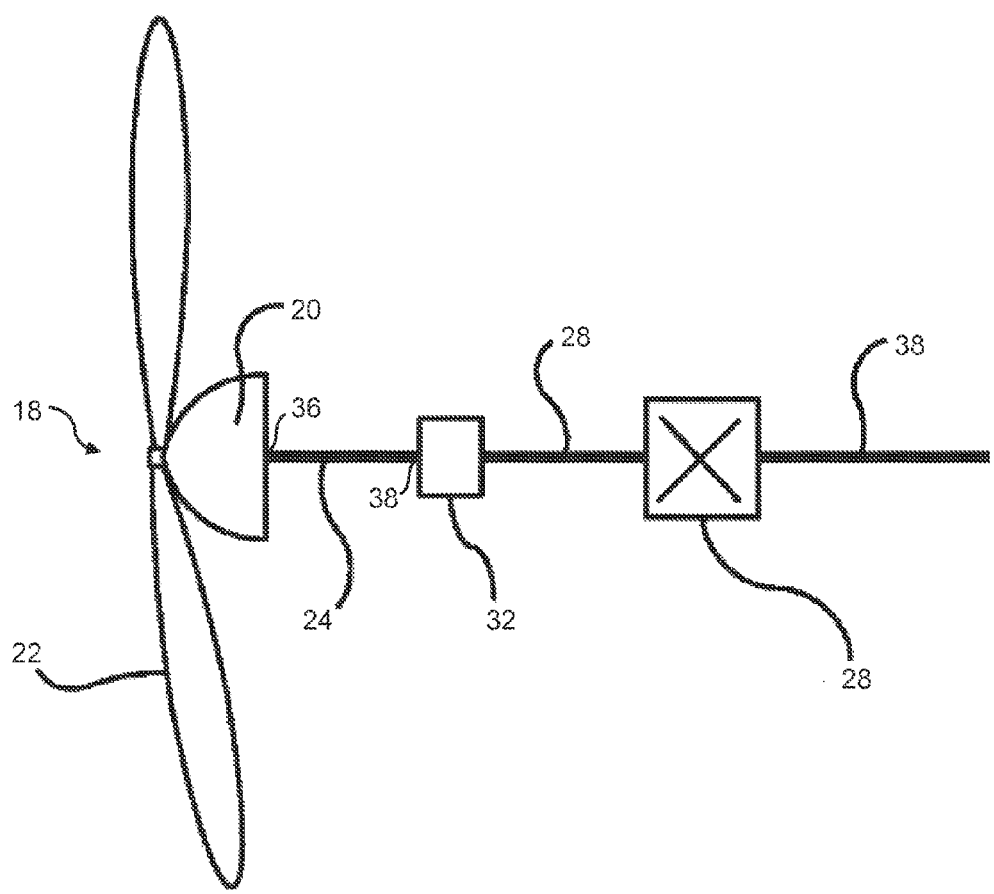
FIG. 2 illustrates a diagram view of a conventional drive train within a wind turbine nacelle.

Referring now to FIG. 2, components are illustrated of a drive train of a wind turbine according to a typical embodiment. The rotor 18 including the hub 20 and rotor blades 22 is connected to a first end 36 of the rotor shaft 24. Within the nacelle 16 (FIG. 1), a gearbox 26 having a gearbox input shaft 28 and a gearbox output shaft 30 converts the rotational frequency of the rotor shaft 24 to a rotational frequency which is required at the gearbox output shaft 30, which is coupled with a generator (not shown). A connection arrangement or coupling 32 is provided for connecting an opposite second end 38 of the rotor shaft 24 with the gearbox input shaft 28. As mentioned above, for certain maintenance procedures or repairs, it is necessary to uncouple the rotor shaft 24 from the gearbox input shaft 28 at the coupling 32.

Various configurations of coupling 32 are known and practiced in the art. In one such configuration, the second end 38 of the rotor shaft 24 has a stepped-down profile and fits into a recess defined in an end of the gearbox input shaft 28. A shrink coupling is used around the overlapping portion of the two shafts to frictionally fix the shafts together. Removal of the shrink coupling may result in material being removed from or deposited onto the surface of the rotor shaft. In an alternate conventional embodiment, the gearbox input shaft 28 slides into a recess defined in the second end 38 of the rotor shaft 24, and a shrink coupling is again used around the overlapping portion of the two shafts to frictionally lock the shafts together. Removal of the rotor shaft 24 from the gearbox input shaft 28 can also result in material being deposited on or removed from the surface of the rotor shaft 24. With either case, it is important to resurface the damaged rotor shaft 24 to ensure concentricity of the rotor shaft 24 with its original rotational axis 34 prior to re-coupling the rotor shaft 24 and gearbox input shaft 28. Any irregularities in the rotor shaft 24 could generate a harmful harmonic load during operation of the wind turbine, resulting in damage to or premature failure of the gearbox 26.

With certain wind turbine drive train configurations, the rotor shaft 24 is coupled directly to a generator without an intervening gearbox 26. The method described herein may also be used for in-situ resurfacing of a rotor shaft 24 in this configuration as well.

Figure 3A:
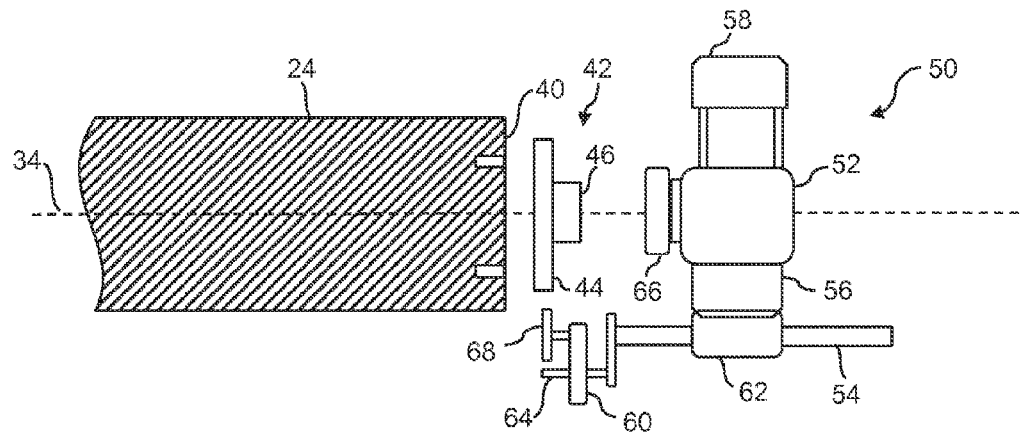
FIGS. 3A and 3B illustrate sequential operational views of a method embodiment for resurfacing an end of the rotor shaft in accordance with the present disclosure.
Figure 3B:
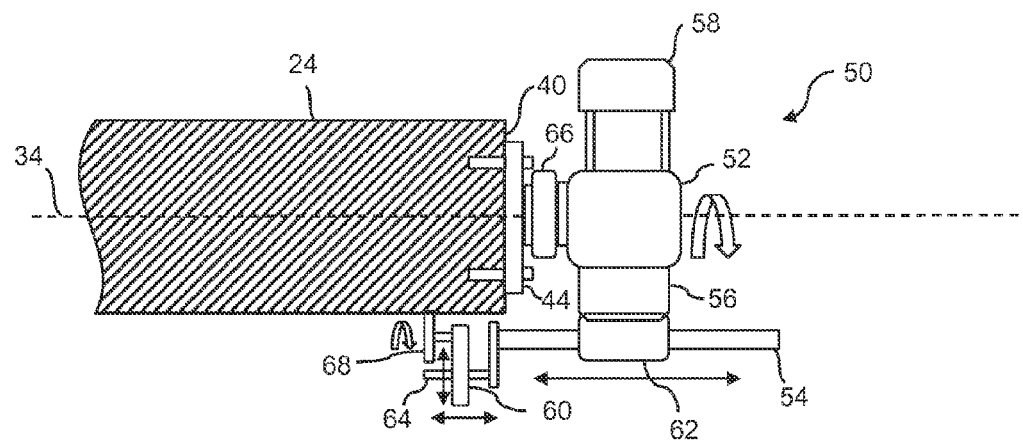

Referring to FIGS. 2, 3A and 3B, aspects of the present method are depicted for in-situ (i.e., within the nacelle 16) resurfacing of the main rotor shaft 24 of a wind turbine, wherein the method is conducted within the nacelle 16 (FIG. 1) with the first end 36 of the rotor shaft 24 remaining coupled to the rotor 20. The second end 38 of the rotor shaft 24 is first uncoupled from the gearbox shaft 28 at the location of the coupling 32 (or from a generator rotor). This process will depend on the type of coupling 32 used to rotationally fix the shafts 24, 28 together, and may include removal of a shrink coupling (also referred to as a shrink disk) from around an overlapping portion of the shafts, as described above. Referring to FIG. 3A, an end face 40 at the second end 38 of the rotor shaft 24 is thus exposed.

A fixture 42 is then attached to the exposed end face 40 so as to be concentric with the rotational axis 34 of the rotor shaft 24 (the rotational axis 34 before any distortions or damage to the rotor shaft 24).

A lathe system 50 is then attached to the fixture 42 so as also to be concentric with the rotational axis 34.

The outer circumferential surface of the rotor shaft 24 along a portion of the end 38 is then machined with the lathe system 50 such that the machined surface is brought to a uniform round state that is concentric with the rotational axis 34 of the rotor shaft 24.

In the embodiment depicted in FIGS. 3A and 3B, the rotor shaft 24 is rotationally locked (e.g., by locking the hub 20) and the lathe system 50 includes a turning bar 54 with attached machining tool 68 (e.g., polishing wheel, grinding wheel, etc.) that is rotated around the rotor shaft 24 concentric to the original rotational axis 34 of the rotor shaft 24. As the turning bar 54 revolves around the rotor shaft 24, the machining tool 68 can be operated by a drive (e.g., motor) 60, which may be slidable along a rod 64 for a fine axial adjustment, as depicted in FIG. 3B. For a large axial adjustment of the machining tool 68, the turning bar may be supported by and axially adjustable along a support member 62, as depicted in FIG. 3B. In turn, the support member 62 is connected to a main body 52 by a flange member 56. The main body 52 includes means for connecting to the fixture 42 attached to the end face 40 of the rotor shaft 24. For example, such means may include a coupler 66 that engages around (or within) and clamps to an axial extension 46 of the fixture 42. The main body 52 is drivable by an internal or externally configured motor so as to revolve around the coupler 66 (and thus, the shaft 24), as depicted in FIG. 3B. A counterweight 56 is connected to the main body 52 opposite to the turning bar 54 assembly.

It should be appreciated that the present method is not limited to any particular type of lathe system 50 that may be connected to the fixture 42. Various lathe systems 50 are known and commercially available in the industry. For example, the type of lathe system 50 depicted in FIGS. 3A and 3B is used by In-Place Machining Company (www.in-place.com) having a principal place of business in Milwaukee, Wis., U.S.A.

The fixture 42 may also be variously configured. In the illustrated embodiments, the fixture 42 includes a plate member 44 that is bolted with bolts 70 to holes defined in the end face 40 of the rotor shaft 24 in a pattern and location that ensures concentricity of the lathe system 50 with the rotational axis 34. As discussed above, the plate member 42 may include an extension 46 or other structure for connecting with the lathe system 50. The holes in the end face 40 of the rotor shaft may be drilled as a step in the present method for the express purpose of subsequently attaching the lathe system 50.

In the embodiment of FIGS. 3A and 3B, the end face 40 of the rotor shaft 24 is flush, and the fixture 42 includes the plate member 44 mounted flush against the end face 40 at a location that ensures concentricity of the lathe system 50 with the rotational axis 34 of the rotor shaft 24.

Figure 4A:
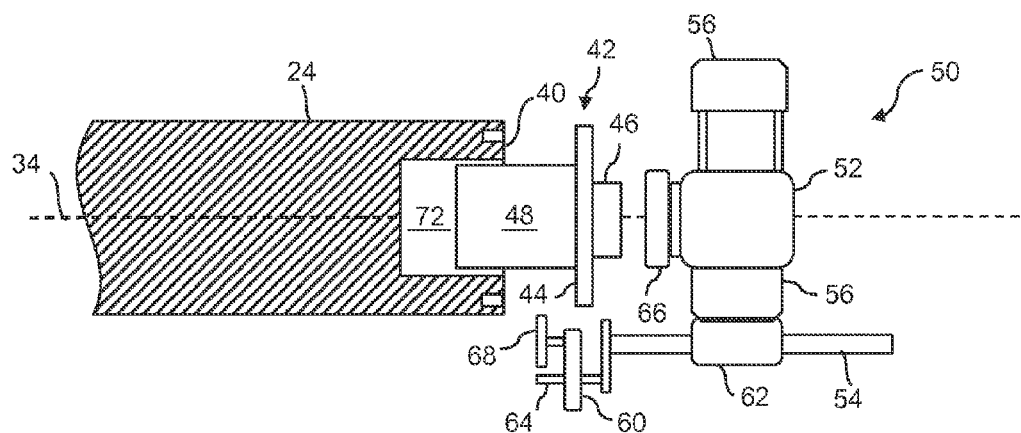
FIGS. 4A and 4B illustrate sequential operational views of another method embodiment for resurfacing an end of the rotor shaft in accordance with the present disclosure.
Figure 4B:
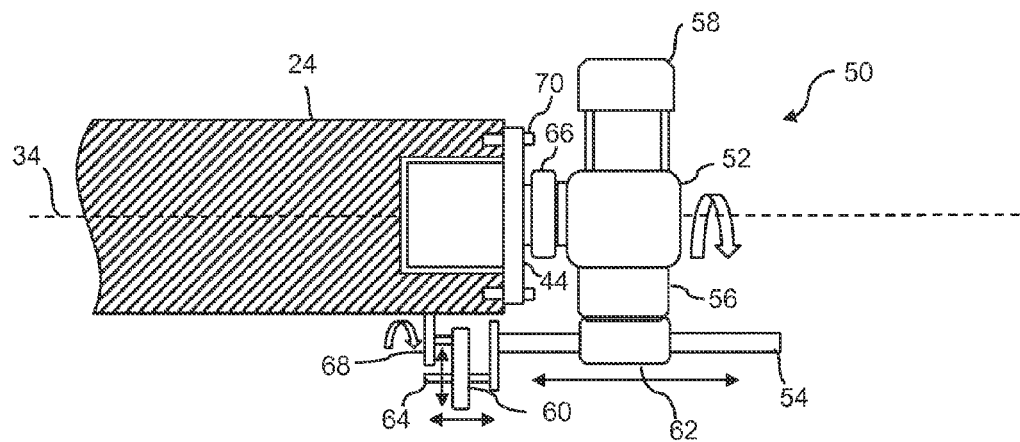

The embodiment depicted in FIGS. 4A and 4B is similar except that the rotor shaft 24 includes a recess 72 defined in the end face 40 thereof. The fixture 42 includes an axial extension 48 that fits into the recess 72 extending from a back side of the plate member 44, with the plate member 44 mounted to the end face 40 around the recess 72 at a location that ensures concentricity of the lathe system 50 with the rotational axis 34.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for in-situ resurfacing of a main rotor shaft of a wind turbine, wherein in an operational state, the main rotor shaft is coupled at a first end to a rotor hub and at the opposite second end to a gearbox or directly to a generator within a nacelle, the method comprising:
   uncoupling the rotor shaft from the gearbox or generator so as to expose an end face of the second end of the rotor shaft;
   attaching a fixture to the exposed end face concentric with a rotational axis of the rotor shaft;
   attaching a lathe system to the fixture;
   machining the rotor shaft surface adjacent to the exposed end face with the lathe system such that the resurfaced portion of the rotor shaft surface is brought to a round state concentric with the rotational axis of the rotor shaft; and
   wherein the method is conducted within the nacelle with the first end of the rotor shaft remaining coupled to the rotor.

2. The method as in claim 1, wherein the rotor shaft is rotationally locked and the lathe system includes a turning bar with attached machining tool that is rotated around the rotor shaft concentric to the rotational axis of the rotor shaft.

3. The method as in claim 2, wherein the fixture is a plate member bolted to holes defined in the end face of the rotor shaft in a pattern and location that ensures concentricity of the lathe system with the rotational axis, the plate member having an extension on which the lathe system is attached.

4. The method as in claim 3, further comprising defining the holes in the end face prior to bolting the fixture to the end face.

5. The method as in claim 1, wherein the rotor shaft is coupled to an input shaft of a gearbox, and the uncoupling step includes removing a shrink fit coupling from the coupled input shaft and rotor shaft.

6. The method as in claim 5, wherein the end face of the rotor shaft is flush, and the fixture is a plate member mounted flush against the end face at a location that ensures concentricity of the lathe system with the rotational axis.

7. The method as in claim 5, wherein the end face of the rotor shaft has a recess defined therein, and the fixture has an extension fitted into the recess and a plate member mounted to the end face around the recess at a location that ensures concentricity of the lathe system with the rotational axis.

* * * * *